T. B. JEFFERY, DEC'D.
K. E., C. T. & H. W. JEFFERY, EXECUTORS.
VEHICLE WHEEL.
APPLICATION FILED AUG. 6, 1906.
995,010. Patented June 13, 1911.
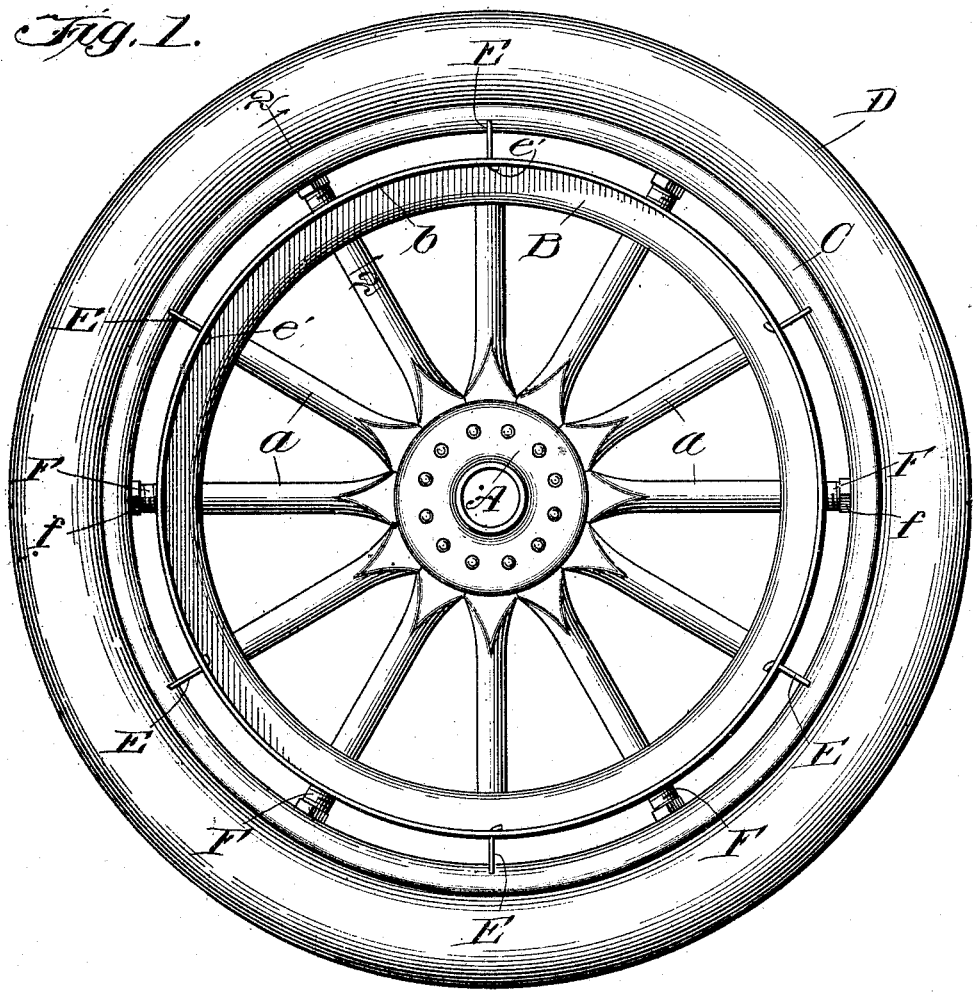
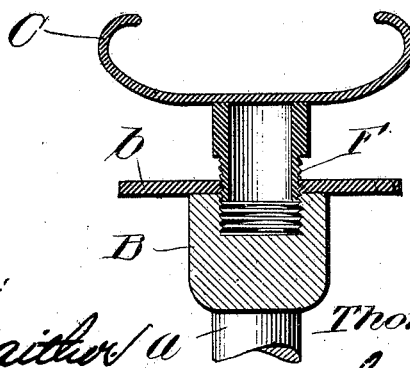
Witnesses:
Harry J. Gaither
Ruby V. Nash
Inventor:
Thomas B. Jeffery
by Chamberlin & Milkman
his Attorneys T. B. JEFFERY, DEC'D.
K. E., C. T. & H. W. JEFFERY, EXECUTORS.
VEHICLE WHEEL.
APPLICATION FILED AUG. 6, 1906.
995,010.
Patented June 13, 1911.
2 SHEETS—SHEET 2.
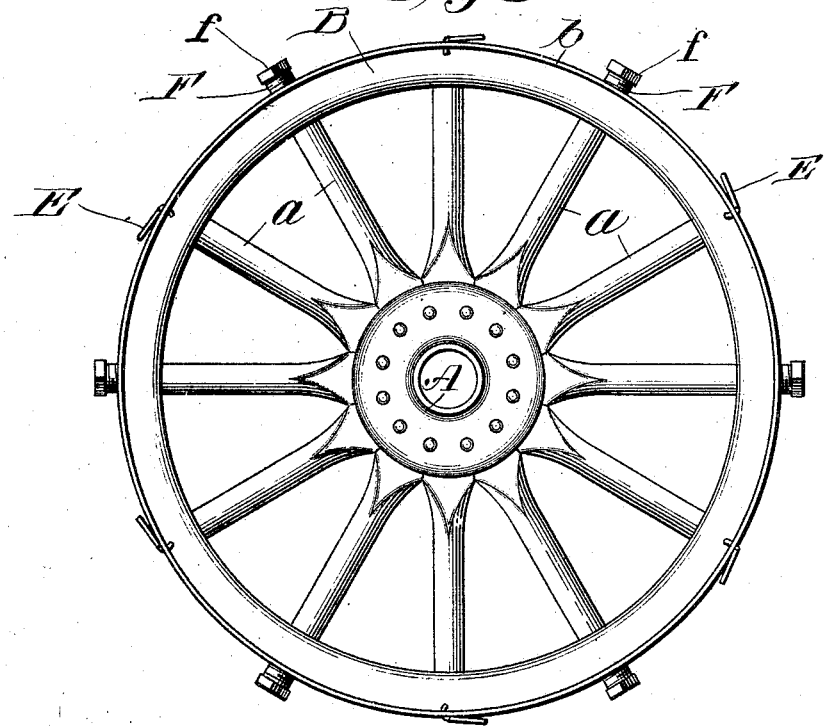
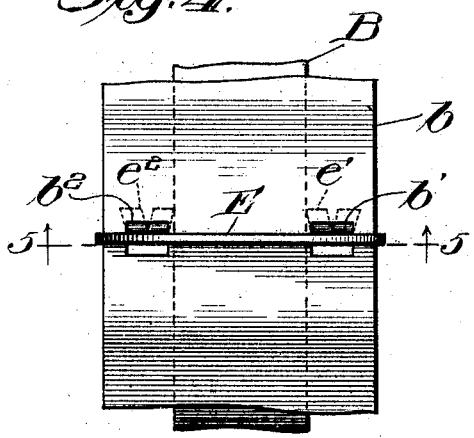
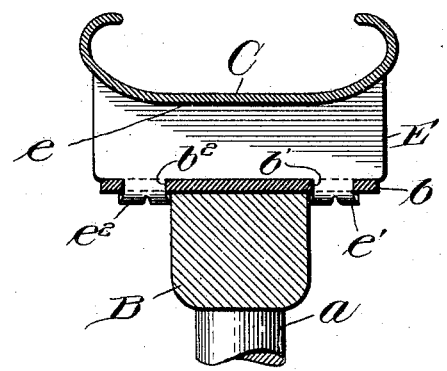
Witnesses,
Harry S. Gaither
Ruby V. Nash
Inventor:
Thomas B. Jeffery
by Chamberlin & Wilkinson
his Attorneys

UNITED STATES PATENT OFFICE.

THOMAS B. JEFFERY, OF KENOSHA, WISCONSIN; KATE E. JEFFERY, CHARLES T. JEFFERY, AND HAROLD W. JEFFERY EXECUTORS OF SAID THOMAS B. JEFFERY, DECEASED.

VEHICLE-WHEEL.

995,010.  Specification of Letters Patent.  Patented June 13, 1911.

Application filed August 6, 1906. Serial No. 329,329.

*To all whom it may concern:*

Be it known that I, THOMAS B. JEFFERY, a citizen of the United States, residing at Kenosha, county of Kenosha, State of Wisconsin, have invented a certain new and useful Improvement in Vehicle-Wheels, and declare the following to be a full, clear, and exact description of the same, such as will enable others skilled in the art to which it pertains to make and use the same, reference being had to the accompanying drawings, which form a part of this specification.

My invention relates in general to vehicle wheels and more particularly to a detachable pneumatic tire rim.

In the use of pneumatic tires inconvenience and labor are occasioned by punctures, as it is then necessary to remove the tire from the rim and secure thereon a new tire, or when a double tube tire is used it is necessary to detach the outer casing from the rim and to remove and repair the punctured inner tube or to insert a new inner tube in place of the punctured one, after which the tire must be inflated. Considerable loss of time and much trouble are consequently occasioned by the puncture of any form of pneumatic tire at present on the market.

The primary object of my invention is to provide a vehicle wheel around which a fully inflated pneumatic tire may be quickly and easily secured, thereby avoiding the necessity of repairing a punctured tire on the road and of inflating the repaired tire or a new one substituted for the punctured tire.

A further object of my invention is to provide means for detachably securing a pneumatic tire rim around the felly of a wheel, thereby permitting a flat tire to be readily replaced by a fully inflated tire.

A still further object of my invention is to provide means for detachably securing a pneumatic tire to a vehicle wheel which will be simple in construction, inexpensive in manufacture and efficient in use.

The embodiment of my invention herein disclosed may be generally described as comprising a metal pneumatic tire rim of any suitable construction, adapted to be secured concentrically around the felly of a wheel, a plurality of plates pivotally secured around the felly of the wheel to rock on axes extending transversely across the felly, the edges of the plates conforming to the inner surface of the tire rim against which they are adapted to be forced to prevent lateral movement of the rim relatively to the felly, and a plurality of radially adjustable rests surrounding the felly and adapted to be interposed between the same and the tire rim to securely retain the rim concentrically around the felly.

My invention will be more fully described hereinafter with reference to the accompanying drawings in which the same is illustrated as embodied in a convenient and practical form and in which—

Figure 1 is an elevational view; Fig. 2 a detail sectional view on line 2—2 Fig. 1; Fig. 3 an elevational view showing the wheel after the removal of the tire and rim; Fig. 4 a detail plan view; and Fig. 5 a sectional view on line 5—5 Fig. 4.

The same reference characters are used to designate the same parts in the several figures of the drawings.

Reference character A indicates the hub of a wheel around which radiate the spokes $a$. B designates the felly surrounding the spokes $a$. A metallic band $b$ preferably surrounds the felly B and overlies the same at each side thereof.

C designates a pneumatic tire rim which may be of any desired type, for convenience a clencher type being shown.

D indicates a pneumatic tire surrounding and detachably supported in any desired manner upon the rim C. So far as my invention is concerned the tire may be of any desired type either single or double tube and may be secured in any suitable way to the rim C.

Pivotally secured around the felly B are plates E adapted to swing on axes transverse to the felly. The outer edge $e$ of each plate E conforms to the under surface of the rim C. The plates E may be conveniently pivoted to the felly B by means of integral lugs $e'$ and $e^2$ which extend through openings $b'$ and $b^2$ through the band $b$ on the opposite sides of the felly. Any desired number of plates E may be secured around the felly preferably, however, they are located in alinement with alternate spokes of the wheel. The adjacent plates preferably swing in opposite directions in order that any tendency of the rim C to creep around the felly may be resisted. The lugs $e'$, $e^2$ may be conveniently retained within the holes $b'$ and $b^2$ by spreading the portions thereof which extend through the holes.

Surrounding the felly B are radially adjustable rests F. Any desired number of these rests may be employed preferably, however, they are located intermediate of the plates E and in alinement with alternate spokes. The rests may conveniently be in the form of exteriorly screw-threaded thimbles which engage screw-threaded openings in the band $b$ and felly B. To facilitate the radial adjustment of the rests they are provided with squared portions $f$ which may be readily engaged by a wrench.

The manner of using my invention is as follows. The plates E are swung into the inclined positions shown in Fig. 3 and the rests F are screwed slightly toward the felly. The rim C around which the tire has been secured and inflated is then located concentrically around the wheel felly, and the rests F adjusted radially so as to closely fit the under-side of the tire rim C. The plates E are them rocked from the inclined positions shown in Fig. 3 to the radial positions shown in Fig. 1 thereby tightly clamping the rim against the rests and also guiding the rim laterally into alinement with the felly. When a tire is punctured the plates E are rocked from the position shown in Fig. 1 to that shown in Fig. 3 after which the rests F are adjusted away from the tire rim so that the rim may be removed from around the wheel and a new rim with a fully inflated tire substituted for it.

It will be observed that the lugs $e'$ and $e^2$ extend at such an angle from the plates E as to limit the swinging of the plates to substantially radial positions, thereby preventing pressure on the rim tending to lock the plates so tightly as to interfere with their being turned into their inclined unlocked positions.

By means of my invention it is possible for a vehicle such as an automobile to carry one or more extra rims with fully inflated tires secured around the same, and when a tire punctures to readily remove its supporting rim from about the wheel and replace the same with one of the extra rims carrying an inflated tire. In this manner it is unnecessary to repair a punctured tire on the road or to detach the same from its rim and substitute a new tire around the rim. The delay and inconvenience incident to a punctured tire are consequently avoided as by my invention a rim with inflated tire thereon may easily and quickly be substituted for a rim the tire around which is punctured.

While I have described more or less precisely the details of construction, I do not wish to be understood as limiting myself thereto, as I contemplate changes in form, the proportion of parts, and the substitution of equivalents, as circumstances may suggest or render expedient, without departing from the spirit of my invention.

Having now fully described my invention what I claim as new and desire to secure Letters Patent is:

1. In a vehicle wheel, a wheel body including spokes, a plurality of plates alining with said spokes and pivotally mounted on axes parallel to the axis of the wheel body, and a rim surrounding said wheel body in engagement with said plates.

2. In a vehicle wheel, a wheel body including spokes, a rim surrounding the wheel body, rocking plates in alinement with certain of the spokes and arranged to engage with the inner surface of the rim, and radially movable rests carried in alinement with the remainder of the spokes and arranged to engage with the inner surface of the rim.

3. The combination with a vehicle wheel, of a rim located around the wheel, a tire secured around said rim, and rocking plates interposed between the wheel felly and said rim for detachably securing the rim concentrically around the wheel.

4. The combination with a vehicle wheel, of a rim located around the wheel, a tire secured around said rim, plates pivotally secured around the wheel felly to rock on axis transverse to the felly and adapted to be swung into engagement with the inner surface of said rim thereby detachably securing the rim concentrically around the wheel.

5. The combination with a vehicle wheel, of a rim located around the wheel, a tire secured around said rim, plates pivotally secured around the wheel felly to swing from inclined to radial positions, said plates conforming to and adapted to be swung into engagement with the inner surface of said rim, thereby detachably securing the rim concentrically around the wheel.

6. The combination with a vehicle wheel, of a rim located around the wheel, a tire secured around said rim, and radially adjustable rests carried by the wheel felly in alinement with the spokes of the wheel for engaging the inner surface of said rim and thereby detachably securing the rim concentrically around the wheel.

7. The combination with a vehicle wheel, of a rim located around the wheel, a tire secured around said rim, rocking plates carried by the wheel felly to swing from inclined to radial positions, radially adjustable rests carried by the wheel felly alternating with said plates, said plates and rests adapted to engage the inner surface of said rim and thereby detachably secure the rim concentrically around the wheel.

8. The combination with a vehicle wheel, of a band secured around the wheel felly, a rim located around and spaced apart from said band, a tire secured around said rim, and radially adjustable means interposed between said band and said rim for detachably securing the rim concentrically around the wheel.

9. The combination with a vehicle wheel, of a band secured around the wheel felly, a rim located around and spaced apart from said band, a tire secured around said rim, plates pivotally secured around said band to swing from inclined to radial positions, said plates adapted to be swung into engagement with the inner surface of said rim thereby securing the rim concentrically around the wheel.

10. The combination with a vehicle wheel, of a band secured around the wheel felly, a rim located around and spaced apart from said band, a tire secured around said rim, plates pivotally secured around said band to swing from inclined to radial positions, and radially adjustable rests carried by said band, said plates and rests adapted to engage the inner surface of said rim thereby detachably securing the rim concentrically around the wheel.

11. The combination with a vehicle wheel, of a rim located around the wheel, a tire secured around said rim, and rocking plates alining with the spokes of the wheel for detachably securing said rim concentrically around the wheel.

In testimony whereof, I sign this specification in the presence of two witnesses.

THOS. B. JEFFERY.

Witnesses:
  J. J. YOUNG,
  G. H. EDDY.